US008255870B2

(12) United States Patent
Banino et al.

(10) Patent No.: US 8,255,870 B2
(45) Date of Patent: Aug. 28, 2012

(54) APPLICATION ACCESS FOR SUPPORT USERS

(75) Inventors: Anne Banino, Trois-Rivières (CA); Christian Paquin, Boucherville (CA)

(73) Assignee: SAP Aktiengesellschaft, Walldorf (DE)

( * ) Notice: Subject to any disclaimer, the term of this patent is extended or adjusted under 35 U.S.C. 154(b) by 1763 days.

(21) Appl. No.: 11/514,364

(22) Filed: Aug. 31, 2006

(65) Prior Publication Data

US 2008/0126227 A1 May 29, 2008

(51) Int. Cl.
*G06F 9/44* (2006.01)
*G06Q 10/00* (2006.01)
(52) U.S. Cl. ............... 717/105; 717/102; 705/28
(58) Field of Classification Search .......... None
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,615,109 A | 3/1997 | Eder | |
| 5,758,327 A | 5/1998 | Gardner et al. | |
| 5,870,716 A | 2/1999 | Sugiyama et al. | |
| 5,930,771 A | 7/1999 | Stapp | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,260,024 B1 | 7/2001 | Shkedy | |
| 6,341,351 B1 | 1/2002 | Muralidhran et al. | |
| 6,505,093 B1 | 1/2003 | Thatcher et al. | |
| 6,507,851 B1 | 1/2003 | Fujiwara et al. | |
| 6,701,299 B2 | 3/2004 | Kraisser et al. | |
| 6,725,204 B1 | 4/2004 | Gusley | |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,080,030 B2 | 7/2006 | Eglen et al. | |
| 7,082,408 B1 | 7/2006 | Baumann et al. | |

(Continued)

FOREIGN PATENT DOCUMENTS

JP 2004-030343 A 1/2004

(Continued)

OTHER PUBLICATIONS

Signorile, Robert, Simulation of a Multiagent System for Retail Inventory Control: A Case Study, Simulation, vol. 78 No. 5, May 2002, Retrieved on [May 1, 2012] Retrieved from the Internet: URL<Signorile, Robert, Simulation of a Multiagent System for Retail Inventory Control: A Case Study>.*

(Continued)

*Primary Examiner* — Thuy Dao
*Assistant Examiner* — Cheneca Smith
(74) *Attorney, Agent, or Firm* — Brake Hughes Bellermann LLP (57) ABSTRACT

One embodiment of the invention relates to a system for providing a support function in maintaining a computing system. The system includes a computer-implemented interface configured to receive a support user identification and a system user identification. The system also includes a support user implementation engine configured to set a support mode based on the support user identification and to log the support user into the computing system based on the system user identification. The system also includes one or more applications implemented by the computing system configured to perform one or more functions on the computing system in accordance with the system user identification and the support user identification.

24 Claims, 4 Drawing Sheets

U.S. PATENT DOCUMENTS

| | | | |
|---|---|---|---|
| 7,089,530 B1* | 8/2006 | Dardinski et al. | 717/105 |
| 7,092,929 B1 | 8/2006 | Dvorak et al. | |
| 7,117,165 B1 | 10/2006 | Adams et al. | |
| 7,117,529 B1* | 10/2006 | O'Donnell et al. | 726/6 |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,657,453 B2* | 2/2010 | Guldner et al. | 705/7.11 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0010659 A1* | 1/2002 | Cruse et al. | 705/28 |
| 2002/0013731 A1 | 1/2002 | Bright et al. | |
| 2002/0023500 A1 | 2/2002 | Chikuan et al. | |
| 2002/0026368 A1 | 2/2002 | Carter, III | |
| 2002/0059108 A1 | 5/2002 | Okura et al. | |
| 2002/0072986 A1 | 6/2002 | Aram | |
| 2002/0072998 A1* | 6/2002 | Haines et al. | 705/28 |
| 2002/0073114 A1 | 6/2002 | Nicastro et al. | |
| 2002/0078159 A1 | 6/2002 | Petrogiannis et al. | |
| 2002/0107713 A1 | 8/2002 | Hawkins | |
| 2002/0116241 A1 | 8/2002 | Sandhu et al. | |
| 2002/0123930 A1 | 9/2002 | Boyd et al. | |
| 2002/0138290 A1 | 9/2002 | Metcalfe et al. | |
| 2002/0147668 A1 | 10/2002 | Smith et al. | |
| 2002/0152128 A1 | 10/2002 | Walch et al. | |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0074269 A1 | 4/2003 | Viswanath | |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0208365 A1 | 11/2003 | Avery et al. | |
| 2003/0229502 A1 | 12/2003 | Woo | |
| 2004/0010463 A1 | 1/2004 | Hahn-Carlson et al. | |
| 2004/0093582 A1* | 5/2004 | Segura | 717/102 |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0267674 A1 | 12/2004 | Feng et al. | |
| 2005/0015303 A1 | 1/2005 | Dubin et al. | |
| 2005/0028133 A1* | 2/2005 | Ananth et al. | 717/105 |
| 2005/0055283 A1 | 3/2005 | Zarovinsky | |
| 2005/0060270 A1 | 3/2005 | Ramakrishnan | |
| 2005/0075915 A1 | 4/2005 | Clarkson | |
| 2005/0075941 A1 | 4/2005 | Jetter et al. | |
| 2005/0081188 A1* | 4/2005 | Kumar et al. | 717/102 |
| 2005/0086122 A1 | 4/2005 | Cirulli et al. | |
| 2005/0086125 A1 | 4/2005 | Cirulli et al. | |
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0120332 A1* | 6/2005 | Martin et al. | 717/105 |
| 2005/0165659 A1 | 7/2005 | Gruber | |
| 2005/0171825 A1 | 8/2005 | Denton et al. | |
| 2006/0004615 A1* | 1/2006 | Guldner et al. | 705/7 |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2007/0050272 A1 | 3/2007 | Godlewski et al. | |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Chen, Derek. Business to Business Standard and Supply Chain System Framework in Virtual Enterprises, Sixth International Conference on Computer Supported Cooperative Work in Design, 2001, Retrieved on [May 1, 2012] Retrieved from the Internet: URL<http://ieeexplore.ieee.org/stamp/stamp.jsp?arnumber=00942305>.*

U.S. Appl. No. 60/374,892, filed Apr. 22, 2002, Krajec.

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22,.Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366 -375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

* cited by examiner

APPLICATION ACCESS FOR SUPPORT USERS

FIELD OF THE APPLICATION

The present invention relates generally to the field of computing systems support and specifically to a system and method for providing a support function to users of an article replenishment application.

BACKGROUND

Technical support for software applications is typically provided using error data stored in a troubleshooting database or based on a re-creation of the problem by technical support staff. In a software application that grants different access rights to different users, it may be difficult for a technical support user to re-create the problem since the technical support user is not using the same computer system in the same configuration as the system user encountering the problem. Solutions to this problem have included allowing the technical support users to directly log in to the computer system as a system user or to assume control of the computer system of the system user. These solutions, however, allow the support user to save edited data within and used by applications on the computer system, which may cause a loss of data integrity.

Thus, there is a need for a system for providing a support function in maintaining a computing system that allows a technical support user to log on to the application as a support user with the access rights of the system user encountering the difficulty. There is also a need for a method for implementing a support function to a support user accessing a computing system that allows a technical support user to log on to the application as a support user with the access rights of the system user encountering the difficulty. There is also a need to implement a simulated write function into a system or method allowing a technical support user to logon with the access rights of a system user so that the support user can fully simulate the application while not saving changes to data within or used by the application.

SUMMARY OF THE INVENTION

One embodiment of the invention relates to a system for providing a support function in maintaining a computing system. The system includes a computer-implemented interface configured to receive a support user identification and a system user identification. The system also includes a support user implementation engine configured to set a support mode based on the support user identification and to log the support user into the computing system based on the system user identification. The system also includes one or more applications implemented by the computing system configured to perform one or more functions on the computing system in accordance with the system user identification and the support user identification.

Another embodiment of the invention relates to a method for implementing a support function to a support user accessing a computing system. The method includes the step of receiving support user login information at a login screen of the computing system. The method also includes the step of receiving a selection of a system user identification of a user of the computing system. The method also includes the step of setting a support mode flag based on the support user identification. The method also includes the step of providing functionality associated with the computing system, the functionality based on the user identification and the support user identification.

Another embodiment of the invention relates to a system for providing a support function in maintaining a computing system. The system includes a computer-implemented interface to an inventory replenishment workbench implementation system configured to receive a support user identification and a system user identification. The system also includes a support user implementation engine configured to set a support flag based on the support user identification and to log the support user into the computing system using the system user identification. The system also includes one or more applications implemented by the computing system configured to check whether the support mode flag is set and perform one or more functions on the computing system in accordance with the system user identification or the support user identification based on the determination.

DETAILED DESCRIPTION OF THE EXEMPLARY EMBODIMENTS

The detailed description of the exemplary embodiments herein primarily describes the claimed invention with respect to an exemplary embodiment involving a retail store and merchandise replenishment computing system support. It is noted that while this retail embodiment is the point of primary discussion, the claimed invention may have wider application outside of a merchandise replenishment system in the retail industry and may be used in any computing system where user support is desired.

Figure 1:
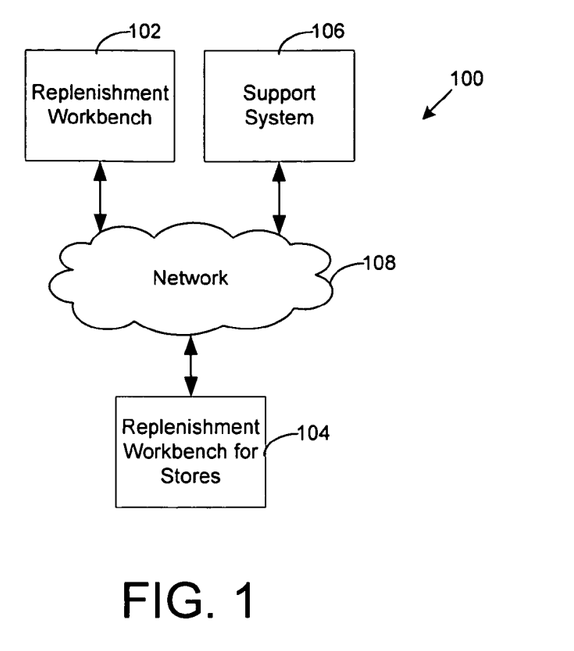
FIG. 1 is a flow diagram illustrating a system for implementing communication between replenishment workbenches and a support system, according to one exemplary embodiment.

Referring to FIG. 1, a data flow diagram illustrates a system that provides a support function for maintaining a computing system 100, according to an exemplary embodiment. Computing system 100 may be a retail computing system for implementing a process of automatically replenishing supply for one or more articles in a store. In other exemplary embodiments, the supply of an article may be replaced in another location, such as a warehouse or distribution center.

Computing system 100 generally includes a replenishment workbench (RWB) 102, a replenishment workbench for stores (RWBS) 104, and a support system 106, each of which communicate over a network 108. Although particular systems are shown in a particular configuration, it should be understood that system 100 may include more, fewer, and/or a different configuration of systems to implement the functions described herein.

RWB 102 is a computer system configured to implement a replenishment function. The replenishment function include optimization of in-stock levels and creation of an efficient flow of merchandise between vendors, distribution centers, and stores. Although a single system is shown and described herein, it should be understood that RWB 102 may be implemented using a number of processes and/or systems operating to perform the functions described herein.

RWBS 104 is a computer system configured to provide a user interface that allows a system user to communicate with RWB 102 to implement the replenishment function. A system user is a user operating RWBS 104 to replenish or approve replenishment orders for a vendor, distribution center, store, or other entity that stores or sells merchandise, for example a retail store manager or a retail store replenishment specialist. Implementing the function may include processing the results of automatic or semi-automatic process implemented by RWB 102, such as reviewing automatic replenishment runs of articles at the store associated with RWBS 104.

Support system 106 is a computer system configured to allow for technical support of RWBS 104 as desired by a user. Support system 106 is generally associated with a central office or location implementing the replenishment function, but may alternatively be implemented for every store, by third party vendors, etc.

Network 108 may be any communication network configured to allow communication between the systems described herein. Network 108 may be the Internet, however in other exemplary embodiments network 108 could be an intranet, such as a local area network (LAN), a combination of internet and intranets, or any other implementation. In various exemplary embodiments, network 108 may facilitate communication via any past, present, or future technology such as a wireless, fiber optic, and coaxial technologies.

Figure 2:
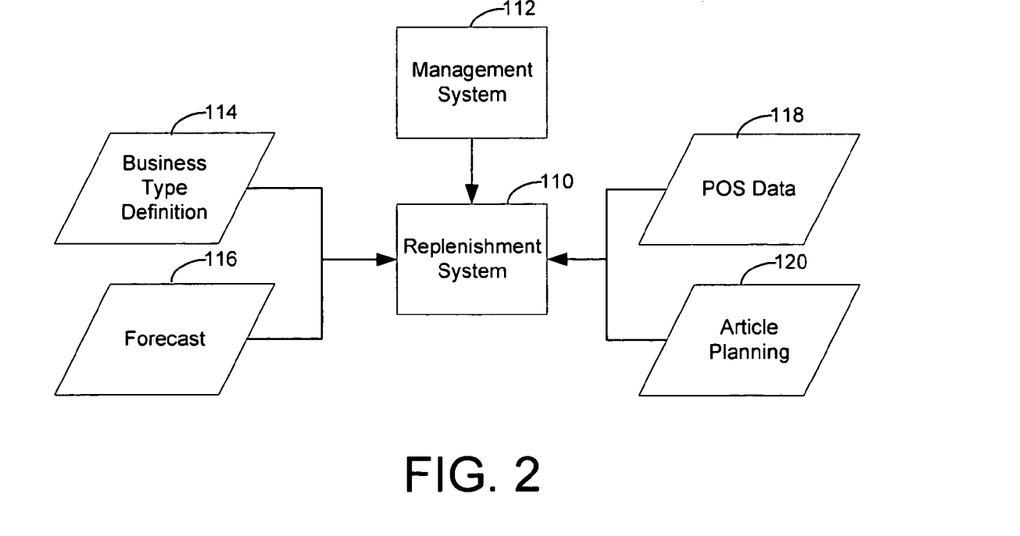
FIG. 2 is a flow diagram illustrating a system for automatically replenishing a supply of an article in the replenishment workbench of FIG. 1, according to one exemplary embodiment.

Referring to FIG. 2, a data flow diagram illustrates a method for automatically replenishes a supply of an article, implemented by RWB 102, according to an exemplary embodiment. RWB 102 implements an automatic inventory replenishment system 110 that receives data regarding one or more articles. The data regarding each article may be received from any number of sources. For example, data regarding the one or more articles may be received by replenishment system 110 from a management system 112. Management system 112 may receive manual input by a user from a keyboard, mouse, or other input device of RWBS 104. Additionally, management system 112 may include an assortment planning system, an article master data management system, a best seller/slow seller management system configured to periodically identify articles that are selling at a rate faster or slower than a rate determined by a planned sales curve, or any other additional systems or combination of systems.

Replenishment system 110 uses received data regarding the articles to implement a replenishment process. Replenishment system 110 may be used to select articles that are to be included in the replenishment process. For example, in one embodiment, replenishment system 110 may be configured such that only data regarding articles associated with a particular predetermined "management type" is automatically forwarded to replenishment system 110 and included in the replenishment process. The management type may be, for example, a predetermined parameter included in data from either an assortment planning system or an article master data management system indicating whether a particular article is to be replenished. Accordingly, in this embodiment, all articles for which data is received by replenishment system 110 may automatically be included in the replenishment process. In another embodiment, the articles to be included may be determined in response to user input designating which articles are to be included in the replenishment process. Following selection and/or identification of the data regarding these articles that is to be included, the data is received by replenishment system 110.

Replenishment system 110 may determine the store in which each article is to be replenished. In one embodiment, replenishment system 110 may determine the store in which each article is to be replenished according to a predetermined "business type" parameter 114. The business type parameter 114 may be a parameter assigned by management system 112 which associates a particular article or group of articles with a particular store or grouping of stores based on, for example, a targeted price range or level for the article or group of articles to be replenished and the store or group of stores, and/or a particular capacity level or range associated with the article or group of articles and the store or group of stores. For example, in one embodiment, replenishment system 110 may receive business type parameter 114 from management system 112 indicating that a group of articles to be replenished, such as "men's athletic socks," is associated with a particular store or group of stores carrying products in a mid-level price range and at a high capacity level. Replenishment system 110 may then use this data to determined the store or group of stores in which the article or group of articles is to be replenished. In another embodiment, the particular store in which the article is to be replenished may be determined by replenishment system 110 in response to user input designating a particular store for each article.

Replenishment system 110 may also determine a requirement quantity for each article. The actual determination of the requirement quantity depends on supply parameters as well as sales data for each article or group of articles. Sales data for each article may include, for example, actual sales data 116 (e.g., actual sales and supply of the article) and projected sales data 118 for each article. Actual sales data may be provided to replenishment system 110 from, for example, management system 112. Projected sales data may be supplied to replenishment system 110 in the form of, for example, a markdown profile for a particular article.

The replenishment quantity determined for each article by replenishment system 110 may be reconciled against an available budget and with actual store capacity for each article or group of articles to determine whether actual funds and capacity are available to support the replenishment quantity for each article. For example, in one embodiment, replenishment system 110 may receive one or more budget parameters and/or one or more capacity parameters in the form of merchandised or assortment planning data 120 from management system 112 or another system. Replenishment system 110 may then reconcile the replenishment quantity with the budget parameter and the actual capacity parameter.

In this way, supplies for articles or groups of articles may be efficiently and automatically replenished according to planning and sales data from various sources. The use of actual and projected sales data in the determination of the requirement quantity allows for early identification and automatic replenishment of increased quantities of articles that are selling at rates faster than originally anticipated, as well as decreased replenishment quantities for articles that are selling at rates slower than originally anticipated. The use of actual store capacities in determining the quantity of an item to be automatically replenished ensures that quantities of particular articles are not procured beyond the capacity of a particular store or group of stores.

Figure 3:
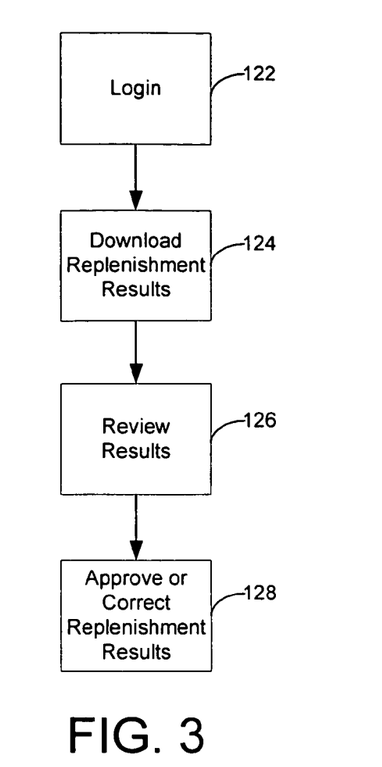
FIG. 3 is a flow diagram illustrating a method for utilizing an interface for the replenishment workbench for stores of FIG. 1, according to one exemplary embodiment.

Referring to FIG. 3, a data flow diagram illustrates a method for the review of an automatic replenishment run for a supply of an article, implemented by RWBS 104. RWBS 104 may be implemented as an interface for a user at a store, and communicate with RWB 102 to send and receive information related to replenishment of one or more articles in the store. Preferably, RWBS 104 is a web-based application, but in other exemplary embodiments may be embodied as a locally resident application or network application.

At a step 122, a user logs in to RWBS 104. In one exemplary embodiment, the user may log in as a system user, for example a retail store manager or a retail store replenishment specialist. A retail store replenishment specialist typically has rights to replenish articles assigned by the retail store manager while the retail store manager typically has rights to replenish all articles as well as assign rights to retail store replenishment specialists. It is noted that in other exemplary embodiments, more or fewer user types may exist with more or fewer access rights than discussed above.

At a step 124, RWBS 104 downloads and displays replenishment results from the last one or more automatic replenishment runs implemented by RWB 102. In one exemplary embodiment, RWBS 104 may automatically display a certain number of replenishment runs based on system defined parameters. In another exemplary embodiment, RWBS 104 may display a number of replenishment runs of a certain type based on user defined parameters (e.g. display or sort by date or status).

At a step 126, the user may review an automatic replenishment run result and decide if any errors occurred or if modifications should be made in order to verify the accuracy of executed replenishment needs.

At a step 128, the user may manually apply new replenishment orders, modify replenishment parameters for automatic replenishment runs, or approve verified automated replenishment orders.

Figure 4:
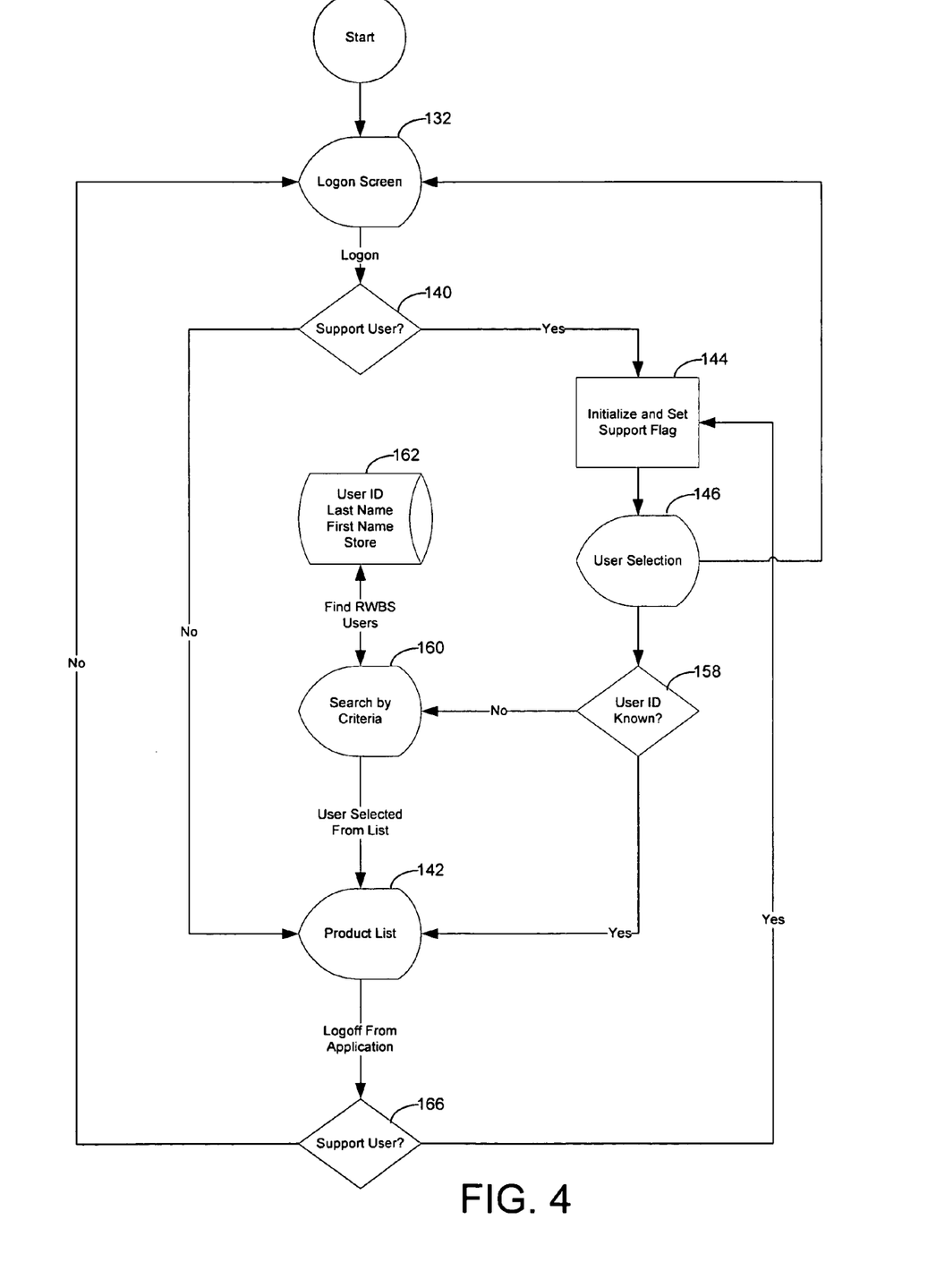
FIG. 4 is a flow diagram illustrating a method of implementing a support user function in the support system of FIG. 1, according to one exemplary embodiment.

Referring to FIG. 4, a data flow diagram illustrates a method 130 for providing login and usage procedure to system and support users of support system 106. The function of a support user is preferably to aid system users with any problems, difficulties, or questions they may be encountering when using RWBS 104. A support user will generally log into RWBS 104 as an actual store user so that all of the access rights are the same as the user encountering difficulties. Support system 106 is configured to allow support users to log in to RWBS 104 of computing system 100 to address the needs of the system user using RWBS 104.

Figure 5:
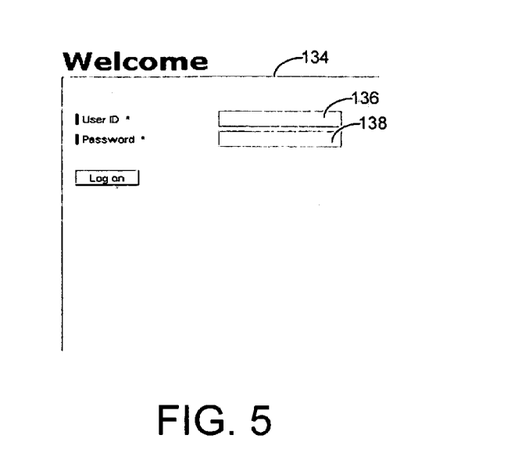
FIG. 5 is a screenshot of a login display for the method of FIG. 3, according to one exemplary embodiment.

At a step 132, all user types logon to RWBS 104 via logon screen 134, shown and described with reference to FIG. 5. To log on to RWBS 104, a user generally provides a user ID 136 and a password 138. User ID 136 and password 138 may be implemented according to any past, present, or future convention that allows for relatively secure access to RWBS 104.

At a step 140, computing system 100 determines whether the type of user attempting to logon to RWBS 104 is a support user or other type of user, for example a system user, based on user ID 136 and/or password 138. If the user is determined to be a system user, the system user is directed to a product list screen for their particular store according to their particular assigned responsibilities at step 142. If the user is determined to be a support user, then support user parameters are set up at step 144.

At a step 144, support system 106 initializes computing system 100 for use by a support user. Initializing computing system 100 for user by a support user includes setting a support mode flag within RWBS 104. The support mode flag is intended to notify computer system 100 that data is being manipulated by a support user so that data is not updated in RWB 102 or RWBS 104 in a substantially permanent manner by the support user. It is typically desired that only system users update such data.

Figure 6:
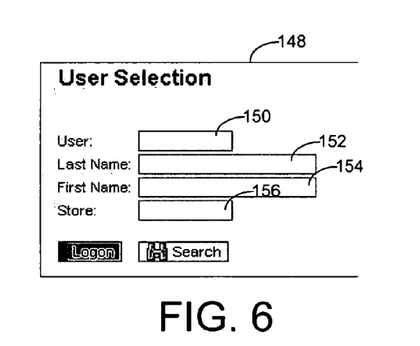
FIG. 6 is a screenshot of a user selection display for the method of FIG. 3, according to one exemplary embodiment.

At a step 146, a user selection screen 148 is presented to the support user, an exemplary embodiment of which is shown and described with reference to FIG. 6. Screen 148 is configured to allow the support user to logon as a system user who has requested assistance so that the support user has each of the same access rights as the system user. Accordingly, the support user will access RWBS 104 having all of the rights and configurations of the system user selected using screen 148. User selection screen 148 generally includes a user field 150, a last name field 152, a first name field 154, and a store field 156.

At a step 158, if the system user ID is known, the support user may directly logon to RWBS 104 by entering the user ID into user field 150. In such a case, the support user is then presented with a product list for the user at step 142. If the user ID is not known, then the support user may search for the appropriate user by entering information into fields 152, 154, or 156. It is noted that in other exemplary embodiments, other fields may be used to search for a user ID instead of or addition to fields 152, 154, or 156. For example, a field related to an article to be replenished or an employee number may be searched.

Figure 7:
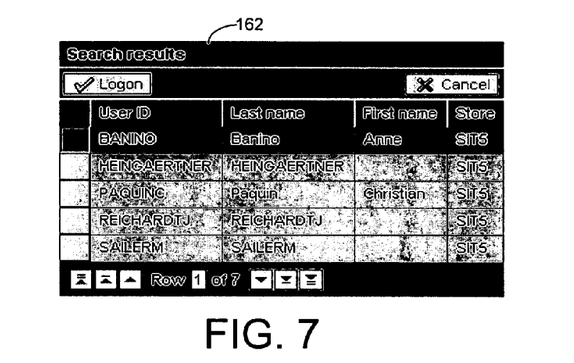
FIG. 7 is a screenshot of a user search display for the method of FIG. 3, according to one exemplary embodiment.

At a step 160, if a user search is to be performed, support system 106 communicates with database 162 to query about user IDs associated with the information entered in fields 152, 154, or 156. These results may be displayed to the support user in an interactive search results screen 162, shown and described herein with reference to FIG. 7. Matches found related to the data entered in fields 152, 154, or 156 are then presented at search results screen 162. At search results screen 162, the support user may select an appropriate user to emulate when logging on to RWBS 104. Once logged on, the support user may be presented with a product list at step 142.

Figure 8:
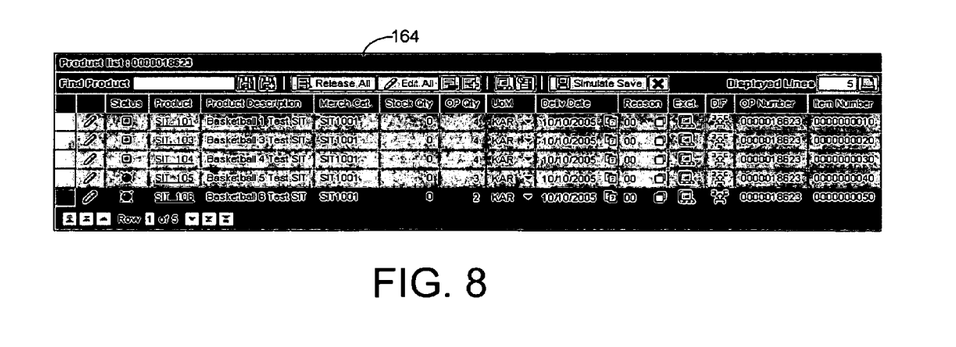
FIG. 8 is a screenshot of a product list display for the method of FIG. 3, according to one exemplary embodiment.

At step 142, a product list screen 164, shown and described herein with reference to FIG. 8, is displayed to the system or support user. Information related to replenishment orders may be displayed to the user based on the store the user is associated with and their access rights. Product list screen 164 may be configured to display any number and/or type of pertinent fields related to replenishment orders for which the user has access. For example, the displayed fields may include status, product, product description, merchandise catalog number, stock quantity, OP quantity, user of management, delivery date, reason code, exception, DIF, OP number, item number fields, etc. Product list screen 164 may further be configured to allow the user to perform a plurality of different functions related to the items being displayed. If a support user is logged on, the support user may perform all of the same commands on the actual store data for which the user they are logged in as has access.

At a step 166, the user logs off from RWBS 104. If the user is a system user, then they are returned to logon screen 134 at step 132 where they or another user may then logon when desired. If the user is a support user, then they are returned to step 144 to reinitialize computing system 100 and set the support mode flag again at which time the support user is returned to user selection screen 148 at step 146 where they may then assist another system user.

Figure 9:
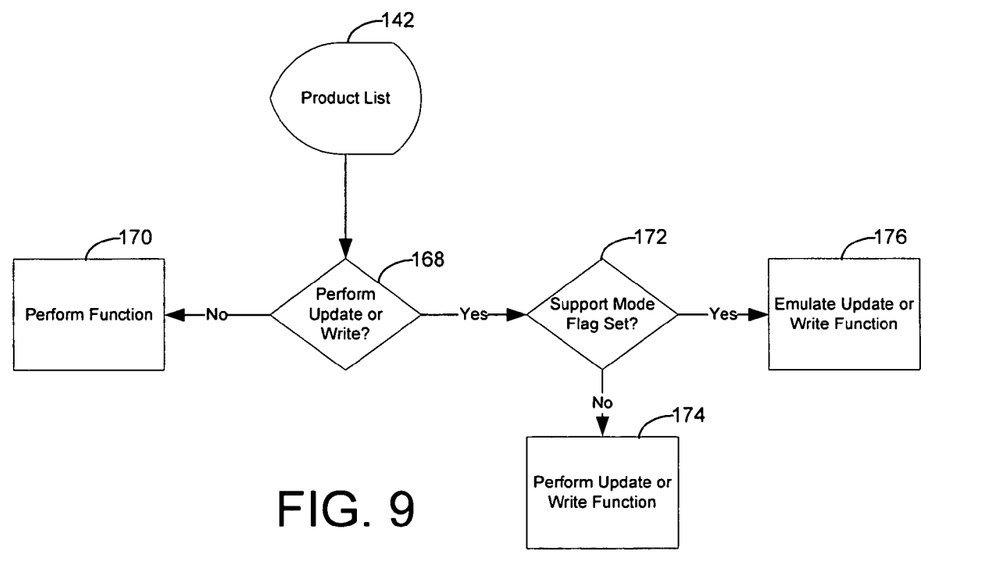
FIG. 9 is a flow diagram illustrating a method for implementing the system of FIG. 1 to include support user capability, according one exemplary embodiment.

Referring to FIG. 9, a flow diagram of more detailed functionality related to the product list screen 164 at a step 142 is shown, according to an exemplary embodiment. The available functions may include write and/or read functions. Where the product list screen 164 includes a write function, the write function may be configured to modify at least one of a store order proposal, an exception, a responsibility, and a user management.

At a step 168, when a function is selected by the user, computing system 100 may check whether the function includes an update or write of data. If the function is not an update or write, then, at a step 170, the function is performed. If the function is a write, then, at a step 172, computing system 100 determines whether the support mode flag is set. If the flag is not set, then the update or write function is performed at a step 174. If the support mode flag is set, then a support user is trying to update or write data and the function is emulated or simulated at a step 176. A simulated update or write function does not record any changes in computing system 100. In one exemplary embodiment, a copy of the data to be written is made and stored separately from the actual system data so that it may be used for further functions. In such an embodiment, whenever the simulated data is later requested, it may be obtained from the location of the simulated copy.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for implementing a support function to a support user accessing a computing system storing system data performed by at least one processer, the method including:

receiving support user login information at a login screen of the computing system;

receiving a selection of a system user identification of a user of the computing system;

setting a support mode based on the support user identification, the set support mode indicating that a function to modify the system data is to be simulated; and providing functionality associated with the computing system based on the user identification and the support user identification, wherein the functionality simulates the function to modify the system data without recording the modification in the computing system.

2. The method of claim 1, wherein the system user identification is associated with at least one of a retail store manager and a retail store replenishment specialist.

3. The method of claim 2, wherein the functionality associated with the computing system is configured to implement and maintain an automatic inventory replenishment system.

4. The method of claim 3, wherein the function to modify the system data is a write function.

5. The method of claim 4, wherein the write function is configured to modify at least one of a store order proposal, an exception, a responsibility, and a user management.

6. The method of claim 1, wherein the function to modify the system data is a write function.

7. The method of claim 1, further including determining whether the functionality is to be performed in accordance with the user identification based on the support mode.

8. The method of claim 1, further including providing a user identification search function to allow a user to select the user identification from a listing of user identifications associated with the computing system following receipt of the support user identification.

9. A system for providing a support function in maintaining a computing system storing system data, the system including at least one processor configured to execute instructions stored on a non-transitory computer readable medium, the system comprising:

a computer-implemented interface configured to receive a support user identification and a system user identification;

a support user implementation engine configured to set a support mode based on the support user identification and to log the support user into the computing system based on the system user identification, the set support mode indicating that a function to modify the system data is to be simulated; and one or more applications implemented by the computing system configured to perform one or more functions on the computing system in accordance with the system user identification and the support user identification, wherein the one or more applications are configured to simulate the function to modify the system data without recording the modification in the computing system.

10. The system of claim 9, wherein the system is a retail computing system and the system user identification is associated with at least one of a retail store manager and a retail store replenishment specialist.

11. The system of claim 10, wherein the one or more applications are configured to implement and maintain an automatic inventory replenishment system.

12. The system of claim 11, wherein the function to modify the system data is a write function.

13. The system of claim 12, wherein the write function is configured to modify at least one of a store order proposal, an exception, a responsibility, and a user management.

14. The system of claim 9, wherein the function to modify the system data is a write function.

15. The system of claim 9, wherein at least one of the one or more applications is configured to perform the one or more functions in accordance with the user identification following a determination whether the function is configured to perform in accordance with the user identification based on the support mode.

16. The system of claim 9, wherein the computer-implemented interface is configured to implement a user identification search function to allow a user to select the user identification from a listing of user identifications associated with the computing system following receipt of the support user identification.

17. A system for providing a support function in maintaining a computing system storing system data, the system including at least one processor configured to execute instructions stored on a non-transitory computer readable medium, the system comprising:

a computer-implemented interface to an inventory replenishment workbench implementation system configured to receive a support user identification and a system user identification;

a support user implementation engine configured to set a support mode based on the support user identification and to log the support user into the computing system using the system user identification, the set support mode indicating that a function to modify the system data is to be performed; and one or more applications implemented by the computing system configured to check whether the support mode is set and perform one or more functions on the computing system in accordance with the system user identification and the support user identification based on the determination, wherein the one or more applications are configured to simulate the function to modify the system data without recording the modification in the computing system.

18. The system of claim 17, wherein the system is a retail computing system and the system user identification is associated with at least one of a retail store manager and a retail store replenishment specialist.

19. The system of claim 18, wherein the one or more applications are configured to implement and maintain an automatic inventory replenishment system.

20. The system of claim 19, wherein the function to modify the system data is a write function.

21. The system of claim 20, wherein the write function is configured to modify at least one of a store order proposal, an exception, a responsibility, and a user management.

22. The system of claim 17, wherein the function to modify the system data is a write function.

23. The system of claim 17, wherein at least one of the one or more applications is configured to perform the one or more functions in accordance with the user identification following a determination whether the one or more functions are configured to perform in accordance with the user identification based on the support mode.

24. The system of claim 17, wherein the computer-implemented interface is configured to implement a user identification search function to allow a user to select the user identification from a listing of user identifications associated with the computing system following receipt of the support user identification.

* * * * *